(12) United States Patent
Groth

(10) Patent No.: US 7,814,700 B2
(45) Date of Patent: Oct. 19, 2010

(54) DEVICE AND SYSTEM FOR ATTRACTING ANIMALS

(76) Inventor: Peter K. H. Groth, 13518 W. Alaska Dr., Lakewood, CO (US) 80228

( * ) Notice: Subject to any disclaimer, the term of this patent is extended or adjusted under 35 U.S.C. 154(b) by 148 days.

(21) Appl. No.: 12/322,001

(22) Filed: Jan. 28, 2009

(65) Prior Publication Data

US 2010/0186279 A1 Jul. 29, 2010

(51) Int. Cl.
*A01M 31/06* (2006.01)
(52) U.S. Cl. ............................................. 43/2; 273/403
(58) Field of Classification Search ....................... 43/2; 446/388; 273/403, 404; D22/125
See application file for complete search history.

(56) References Cited

U.S. PATENT DOCUMENTS

| | | | |
|---|---|---|---|
| 4,590,699 A * | 5/1986 | Nicks ............................... | 43/2 |
| 4,693,028 A | 9/1987 | Hill | |
| 4,745,699 A | 5/1988 | Gage | |
| 4,852,288 A * | 8/1989 | Payne et al. ....................... | 43/2 |
| 4,887,376 A | 12/1989 | Sibley et al. | |
| 5,029,408 A | 7/1991 | Smith | |
| D339,402 S | 9/1993 | Santos, Jr. | |
| 5,335,438 A | 8/1994 | Terrill | |
| 5,546,692 A * | 8/1996 | Byers ............................... | 43/2 |
| 5,791,081 A * | 8/1998 | Turner et al. ..................... | 43/2 |
| 6,438,894 B1 | 8/2002 | Silvandersson et al. | |
| 6,508,028 B1 | 1/2003 | Crowe | |
| 6,510,644 B1 * | 1/2003 | Gollnik ........................... | 43/2 |
| 6,634,132 B2 | 10/2003 | Lorenz | |
| D505,990 S | 6/2005 | Ashley | |
| D553,706 S * | 10/2007 | McKinnon .................. | D22/125 |
| D565,690 S * | 4/2008 | McKinnon .................. | D22/125 |
| D572,335 S * | 7/2008 | McKinnon .................. | D22/125 |
| 7,441,365 B2 * | 10/2008 | Brunner et al. .................... | 43/2 |
| 7,549,248 B1 * | 6/2009 | Luster ............................. | 43/2 |
| 2006/0032104 A1 | 2/2006 | Brunner et al. | |
| 2008/0209729 A1 * | 9/2008 | Tursky ........................ | 29/890 |
| 2010/0071248 A1 * | 3/2010 | Brestal et al. .................... | 43/3 |

* cited by examiner

*Primary Examiner*—Christopher P Ellis
(74) *Attorney, Agent, or Firm*—Dorr, Carson & Birney, P.C.

(57) ABSTRACT

A device is disclosed for attracting predetermined species of animals based on fractal geometry and the animal's own color perception. The device includes a planar object having at least two opposed faces and a shape unique to the fractal dimension of the predetermined animal species which the device is designed to attract. A light emitting surface is disposed on at least one face of the planar object. The surface is covered with light generating elements adapted to emit a light color based on color perception of the predetermined specific species, which color wavelength and brilliance is unnatural in normal surroundings relative to that species' own color perception. Finally, a mechanism is provided for mounting the object and enabling oscillatory-like movement in the object about an axis thereof.

22 Claims, 9 Drawing Sheets

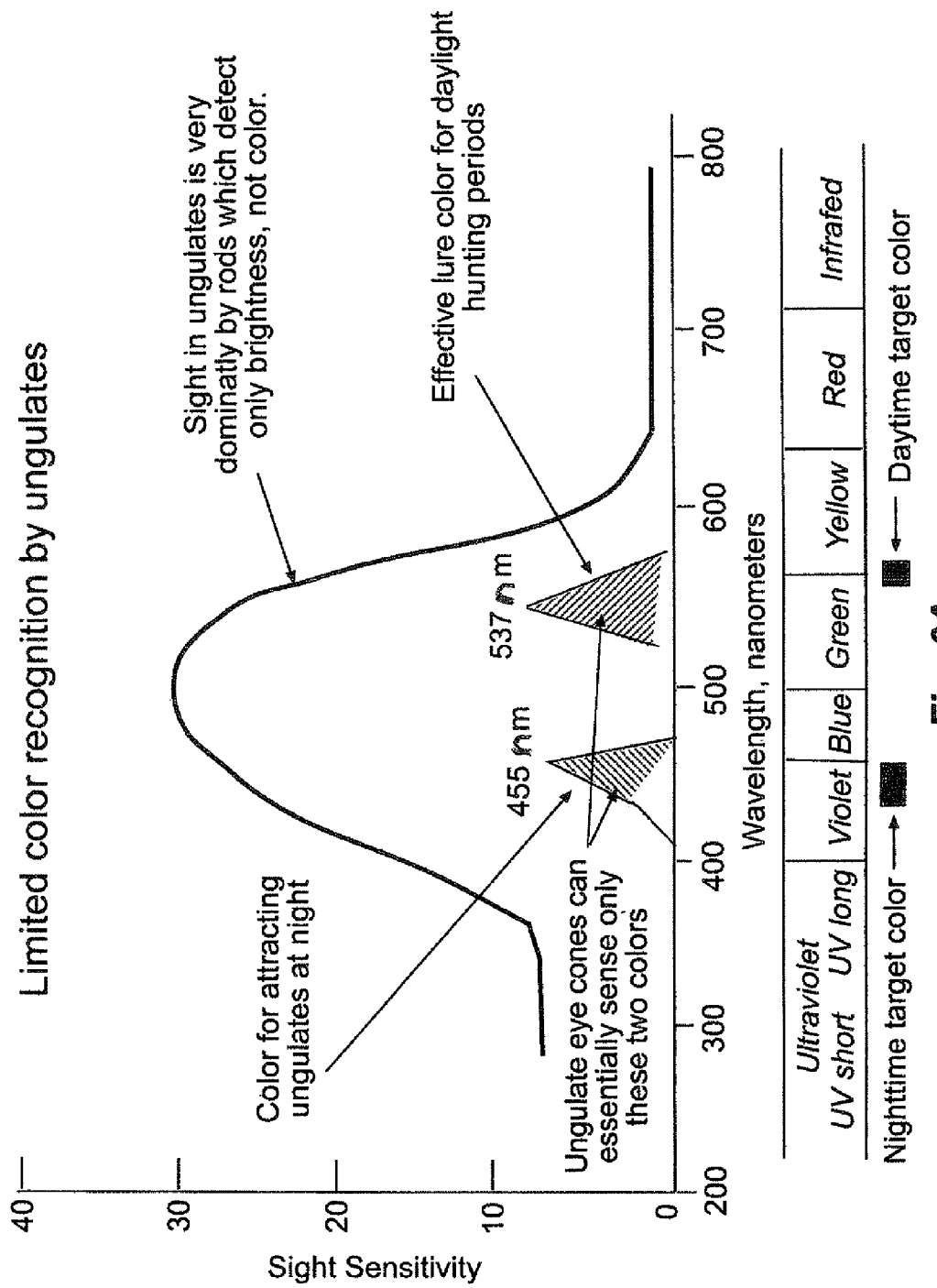

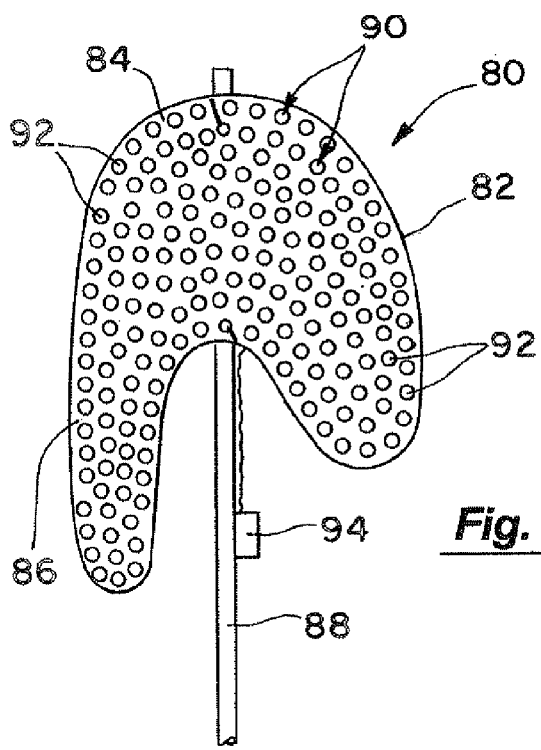
Fig. 8
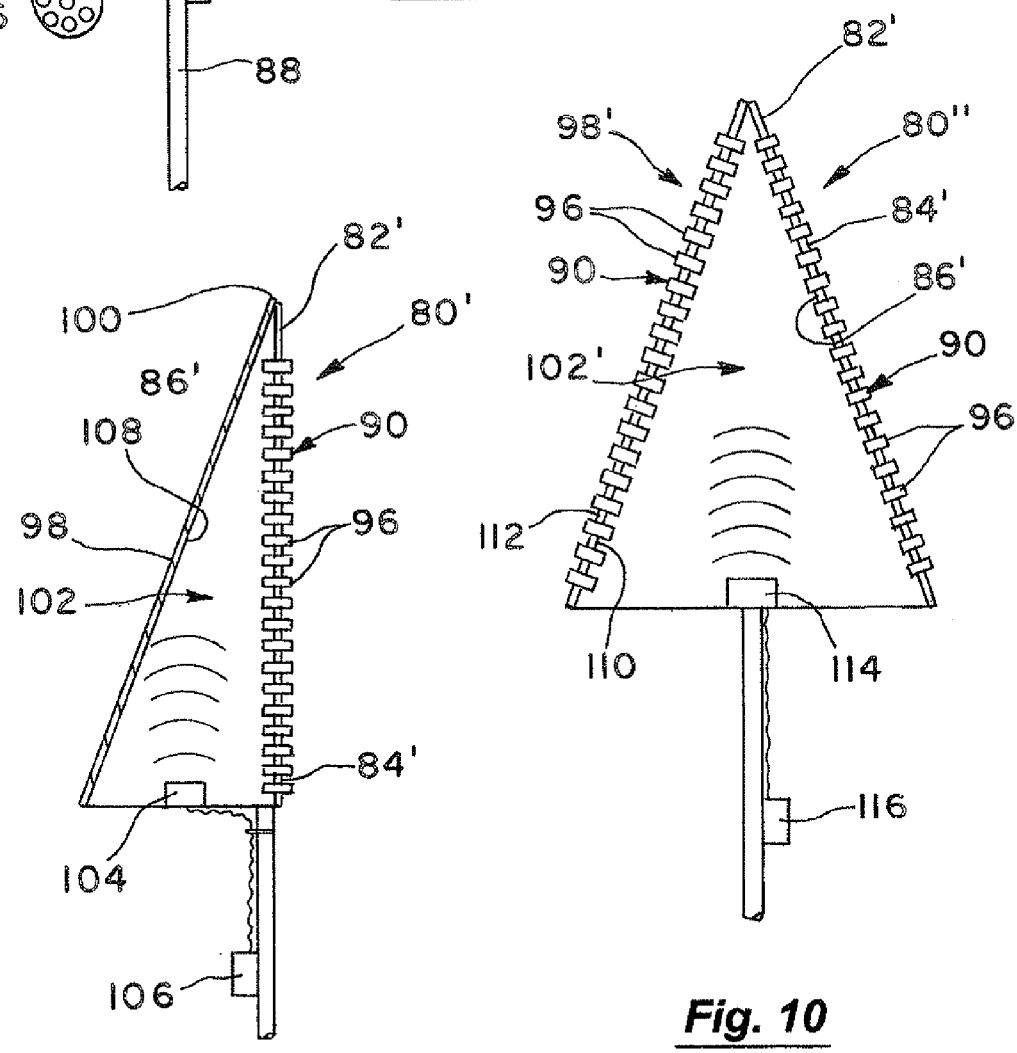
Fig. 9
Fig. 10

DEVICE AND SYSTEM FOR ATTRACTING ANIMALS

BACKGROUND OF THE INVENTION

1. Field of the Invention

The present invention relates generally to animal decoys and, more particularly, to devices and systems using sight to attract animals to an area for hunting, catching, pest control, population counting purposes and the like. Specifically, the present invention relates to a lure device and system for attracting animals based on fractal geometry and animal color perception.

2. Description of the Prior Art

Lure or decoy devices have long been used by hunters, as well as other entities, to attract animals to the same area or vicinity as the decoy. This significantly enhances the odds of finding and/or catching the desired prey. Such decoys or lures have been used for attracting a wide variety of animals including big game animals such as ungulates, waterfowl, fish, animal pests such as coyotes, and the like. In addition to hunting, other applications for such lures or decoys have included pest control, animal population counting, wildlife photography or observation, and wild game management.

Typically, such lures or decoys attempt to visually represent in some manner the targeted or desired animal as seen by humans. For example, fishing lures utilize color, size, movement and scent in an attempt to duplicate small bait fish appearance and movement through water. Examples of such devices include those illustrated in U.S. Pat. No. 4,693,028, U.S. Pat. No. 4,745,699, and U.S. Pat. No. 4,887,376. Other such examples include waterfowl decoys such as illustrated in U.S. design Pat. No. D339,402 and U.S. Pat. No. 6,508,028.

Decoys and lures for big game animals have also been designed in much the same way. Some of these devices attempt to visually represent the side profiles of all or a portion of these animals such as illustrated in U.S. design Pat. No. D505,990 and U.S. Pat. No. 6,634,132. Other prior art devices attempt to use both the visual representation coupled with movement and/or sound. Examples of such devices wherein deer tail flags of various designs are displayed and coupled with mechanisms for moving them include those illustrated in U.S. Pat. No. 5,029,408, U.S. Pat. No. 5,335,438, U.S. Pat. No. 5,546,692 and U.S. Pat. No. 6,510,644.

While some of these devices have proven to be effective in certain instances, they are all based on attempts to duplicate actual profile patterns and colors of the targeted animal as they occur in nature and as they are perceived by humans. They are based on the assumption that animals see and view their own kind in the same manner as human beings view animals. Unfortunately, this is just not the case in that the color spectrum perceived by animals is very different from the color spectrum perceived by humans. As a result, the lures and decoys that presently exist are only marginally effective in actually attracting animals to a specific location. Thus, there remains a need for lure and decoy devices and systems which incorporate colors and profiles that are noticeable and attractive to animals and are based on the animal's own color perceptions and visual reactive behavior. Therefore, there remains a need in the art for such a device and system, and the present invention addresses and solves this particular problem.

SUMMARY OF THE INVENTION

Accordingly, it is one object of the present invention to provide a decoy or lure device for animals of all types for purposes of hunting, population counting, fishing and the like.

It is another object of the present invention to provide a device for attracting animals of a predetermined species based on fractal geometry and the animals' own color perception.

Yet another object of the present invention is to provide an animal lure device which is not designed to visually duplicate the animal in size and/or coloration as seen by humans.

Still another object of the present invention is to provide a device particularly useful for attracting ungulates during early morning and evening twilight hours based on the animals' own color perception while creating color overload and saturation at specific wavelengths as determined by the ungulates' eye cones.

To achieve the foregoing and other objects and in accordance with the purpose of the present invention, as embodied and broadly described herein, a lure device is disclosed for attracting predetermined species of animals based on fractal geometry and the animal's own color perception. The device includes a planar object having at least two opposed faces and a shape unique to the fractal dimension of the predetermined animal species which the device is designed to attract. A light emitting surface is disposed on at least one face of the planar object. The surface is covered with light generating elements adapted to emit a light color based on color perception of the predetermined specific species, which color wavelength and brilliance is unnatural in normal surroundings relative to that species' own color perception. Finally, a mechanism is provided for mounting the object and enabling oscillatory-like movement in the object about an axis thereof.

In one modification of the invention, the color of light created by the device's light emitting surface is based on the wavelength sensitivity of the eye cone receptors of the predetermined animal species. In one aspect of this, the color emitted by the light emitting surface is sufficiently intense to create visual color overload and saturation at the specific wavelength spectrum selected for the predetermined species.

In another modification of the invention, the fractal dimension is selected based on the profile of the predetermined animal species, which profile is naturally pleasing to the animal and invokes curiosity from that species. In one form of this, the predetermined animal profile for the fractal dimension is the rear profile which creates an added sexual interest view.

In yet another modification, the predetermined animals are game animals, and the object shape is based on the shape and color pattern of the rear rump patch of the game animal. In this modification, the movement mechanism is adapted to simulate the changing exposure of the colored inner leg flanks of the game animal.

In another modification of the invention, the device is adapted to attract ungulates. In this particular form, the first depending element is elongated in shape and substantially uniform in width, while the second depending element is wider and shorter in shape relative to the first depending element.

In still another modification, the light generating elements of the device of the invention are passive reflecting elements. In one form of this modification, the light emitting surface is retroreflective, and the light generating elements are optical microprisms for reflecting sunlight impinging thereon.

In yet another modification of the invention, the light generating elements of the device are active light generating members. In one form of this modification, the active light generating members are a plurality of light emitting diodes.

In another form of the above modification of the invention, the device further includes a plate member sized and shaped substantially the same as the planar object, with the plate member being secured to but spaced apart from the planar object. A light source is disposed is the space between the planar object and the plate member, and the active light generating elements are in the form of a plurality of clear, light transmitting rods projecting through the planar object into the space between the planar object and the plate member for exposure to the light generated by the light source.

In another modification of the present invention, a decoy device is provided for luring big game animals. In this form, the device includes a planar object having at least two opposed faces and a shape unique to the fractal dimension of the particular predetermined big game animal species the device is designed to attract. A highly retroreflective surface is disposed on at least one face of the planar object. The surface is covered with optical microprisms and has a species-specific color adapted to exploit the color blindness and color perception of the specific predetermined big game species, which color wavelength and brilliance is unnatural in normal surroundings relative to that species' own color perception. Finally, a mounting mechanism is provided for mounting the object at the approximate eye height for the particular predetermined big game animal species the device is designed to attract, the mechanism further being adapted to enable oscillatory-like movement of the object about an axis thereof to imitate movement of an animal.

Yet another modification of the present invention includes a system for attracting and luring big game animals into open fields for hunting or herd management. The system of the invention includes at least one pair of decoy devices each in the form of a planar object having at least two opposed faces and a shape unique to the natural fractal dimension of the particular big game animal species which the system is designed to attract and lure. A mounting mechanism is provided for securing each decoy device to the ground surface and attaching the planar object thereto to enable oscillatory-like movement thereof about the axis of the mounting mechanism. A light emitting surface is disposed on at least one face of each planar object, the surface being covered with light generating elements adapted to emit a light color based on a species specific color adapted to exploit the color blindness and color perception of the desired specific big game species for which the system is designed to attract and lure, which color and brilliance is unnatural in normal surroundings relative to that species' own color perception. Finally, the pair of decoy devices are mounted to the ground at animal eye level and spaced apart at approximately 90° relative to each other to attract the desired specific big game animals from all directions into the field in which the system devices are placed.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings:

FIG. 6A is a graphical representation similar to FIG. 6 but specifically illustrating the two color wavelengths recognized by ungulate eye cones;

FIG. 8 is a front perspective view of an embodiment of an active lure device constructed in accordance with the present invention and particularly useful in attracting ungulates;

FIG. 9 is a sectional schematic view of an alternate active lure device embodiment constructed in accordance with the present invention; and FIG. 10 is a sectional schematic view of yet another active lure device embodiment constructed in accordance with the present invention.

DETAILED DESCRIPTION OF THE EXEMPLARY EMBODIMENTS

Prior art decoy and lure devices have principally relied on duplicating the natural visual representations of animals as perceived and discerned by humans. However, such an approach does not take into consideration the fact that animals do not "see" in the same manner as humans. The retinas of all vertebrates include both rod and cone receptors. Rods are designed to be sensitive to light intensity and thus sensitive to dim light, while cone receptors are designed to be sensitive to color differentiation. Human eyes use a balance of both rods and cones to see both colors and light intensity over the full wavelength spectrum of visible light, while animals do not function in this manner. In fact, approximately 90% of animal vision arises from the rods in the retina and inner eye's lens reflective tapetum, thereby enabling them to have higher brightness over a much broader wavelength spectrum including certain ultraviolet ranges and during very low light intensity or dark environments (see FIG. 6). On the other hand, most animals are virtually colorblind in that they have very little color differentiation capability. The present invention, therefore, is designed to take advantage of these facts by using a fractal geometry-based outline and introducing an unnaturally intense (brilliant) color into a natural setting at a wavelength perceivable by the animal, thus creating an unnatural sight and maximizing an animal's curiosity as described in greater detail below.

The device of present invention incorporates five unique aspects or dimensions unknown to the prior art. The first is a natural, calming decoy shape calculated with fractal geometry techniques which is unique to each animal or bird species. The second is a species-specific spectral color which exploits that particular species' partial color blindness. A third unique aspect to the invention is the use of a highly retroreflective (directed backward) surface in a passive lure device, or of active light generating members in an active device, which attract the animal from a far distance. The fourth new component is a sexually evocative shape stylized from the animal's fractal geometric dimensions combined with the species rear shape and color pattern, which evokes curiosity at intermediate distances. Finally, the invention includes a shape which moves in a breeze to imitate an animal's movement as viewed from the rear.

Figure 1:
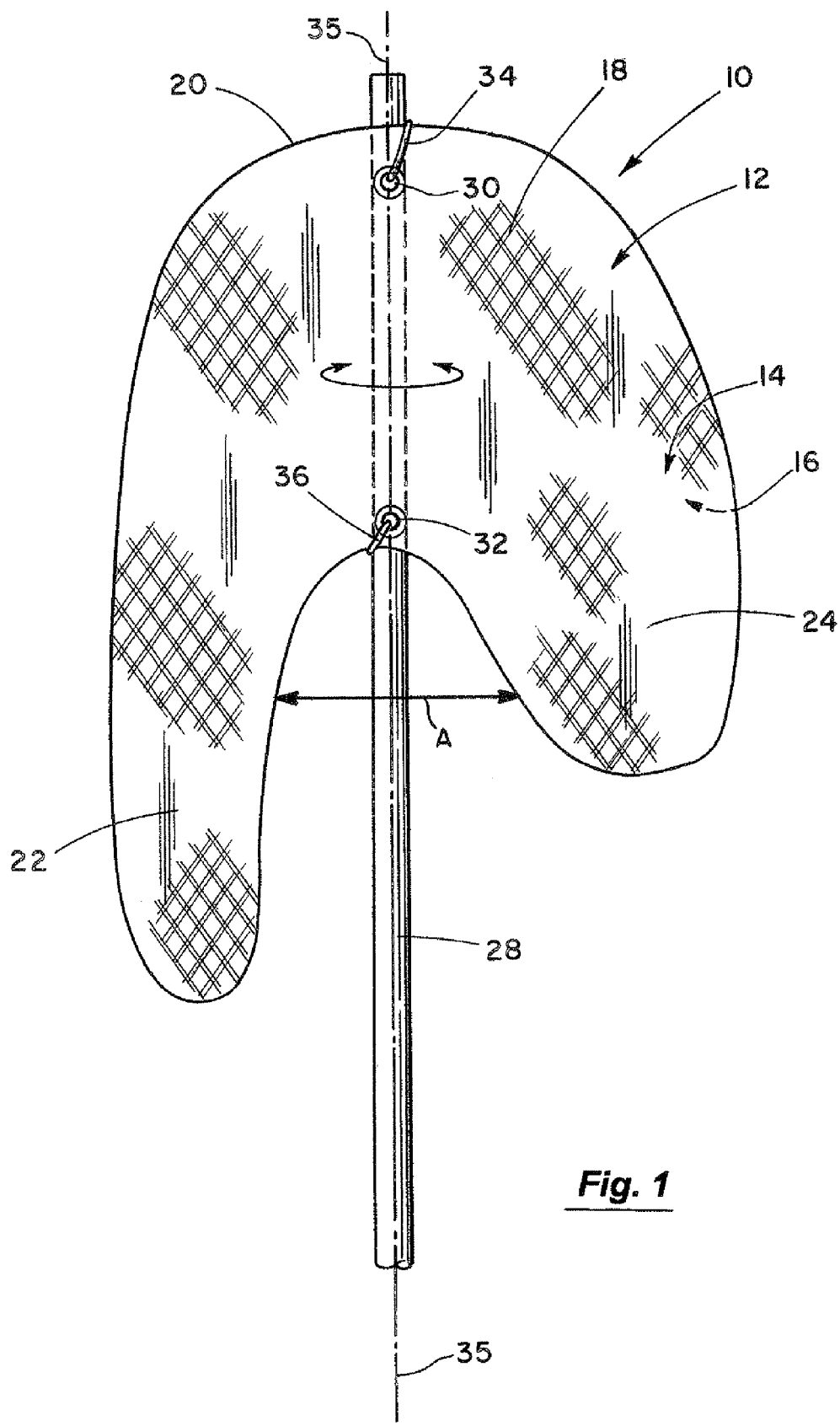
FIG. 1 is a front perspective view of one embodiment of a lure device constructed in accordance with the present invention and particularly useful in attracting ungulates.

Referring now to FIGS. 1-2, a passive lure device 10 is illustrated. The device 10 is preferably in the form of a flat plate 12 having a pair of opposed outer surfaces or faces 14, 16. The plate 12 preferably includes an upper lobe portion 18 having a rounded upper edge 20, and a pair of downwardly depending lobe elements 22, 24 that are spaced apart by a distance "A". In one preferred form, the first lobe element 22 is elongated in shape and narrow along its length, while the second lobe element 24 is wider and shorter than the first lobe element 22. A mounting mechanism 26 is provided for securely attaching the device 10 to a ground surface at approximately animal eye level. In the illustrated embodiment, the mechanism 26 includes a staff or post 28 which is insertible into the ground, a pair of apertures 30, 32 positioned along an axial centerline 35 of the plate 12, and attachment straps 34, 36 which are secured through the apertures 30, 32 and snugly attached to an upper portion of the staff 28. The straps 34, 36 may take any desired form such as Velcro straps, cloth ties or snaps, string and the like. In this manner, the plate 12 can wobble or move in an oscillatory-like manner about its centerline axis 35 in response to breeze and wind movement.

Figure 1B:
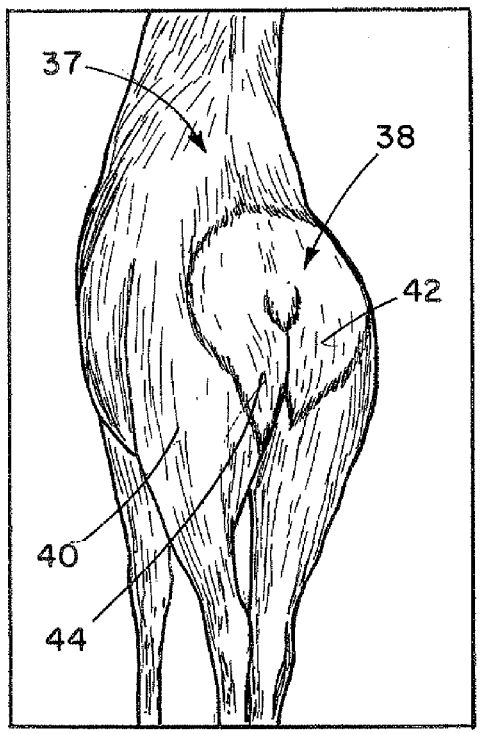
FIG. 1B is rear perspective view of a walking elk particularly illustrating the rump patch thereof.
Figure 2B:
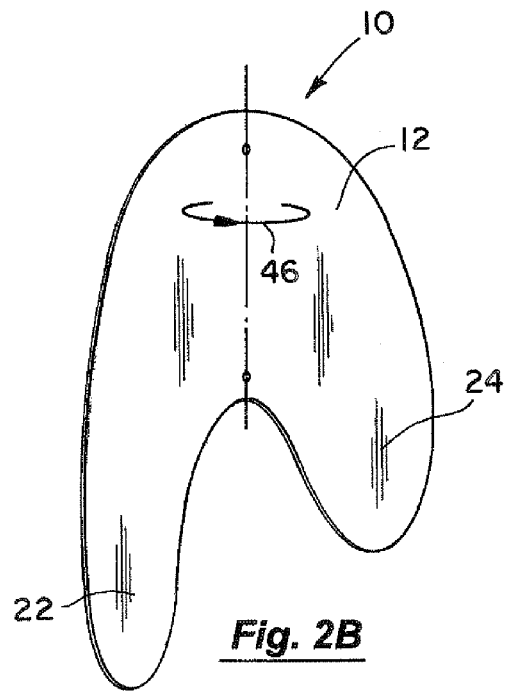
FIG. 2B is an angular perspective view of the device of FIG. 2A with the device in a first rotational position relative to its axis in a first direction with the left lobe thereof about 45° forward.
Figure 2A:
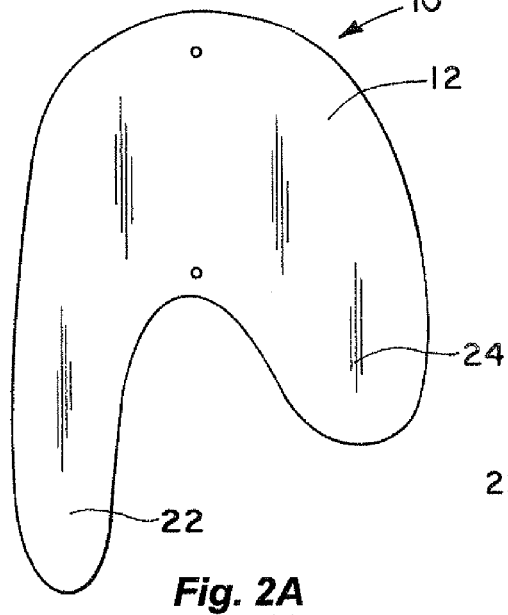
FIG. 2A is a reduced front perspective view similar to the embodiment illustrated in FIG. 1.
Figure 2C:
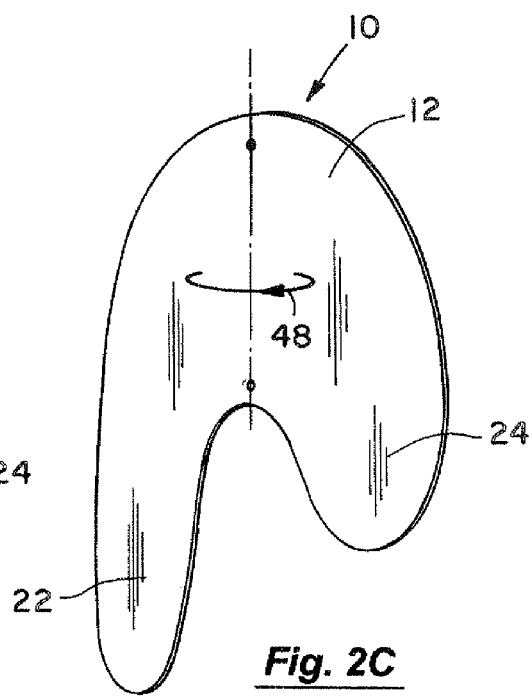
FIG. 2C is an angular perspective view of the device of FIG. 2A with the device in a second rotational position relative to its axis in a second opposite direction with the right lobe thereof about 45° forward.

At least one of the faces 14, and preferably both faces 14, 16, has a high intensity fluorescent color which is highly visible to the eyes of the particular animal species of interest as discussed in greater detail below. The particular outline and color illustrated in FIGS. 1-2 is preferred for ungulates such as elk and deer. FIG. 1B illustrates the rear view of a walking elk 37. As can be seen from this figure, the rump patch 38 has a lighter color than that of the surrounding fur 40. Moreover, the patch 38 includes two portions 42, 44 that extend downwardly along the upper inner flanks of the elk legs. As the elk 37 walks, the portions 42, 44 visually change in dimension, with one always being visibly shorter and wider than the other from a given observation perspective. Thus, as the device 10 is mounted to the ground, a light wind or breeze will cause of the plate 12 to rotationally oscillate or wobble slightly in opposite directions 46, 48 as illustrated in FIGS. 2A-2C, thereby simulating or imitating movement of the rump patch 38 of a walking elk due to the relative movement of the lobe elements 22, 24 thereof.

Figure 3:
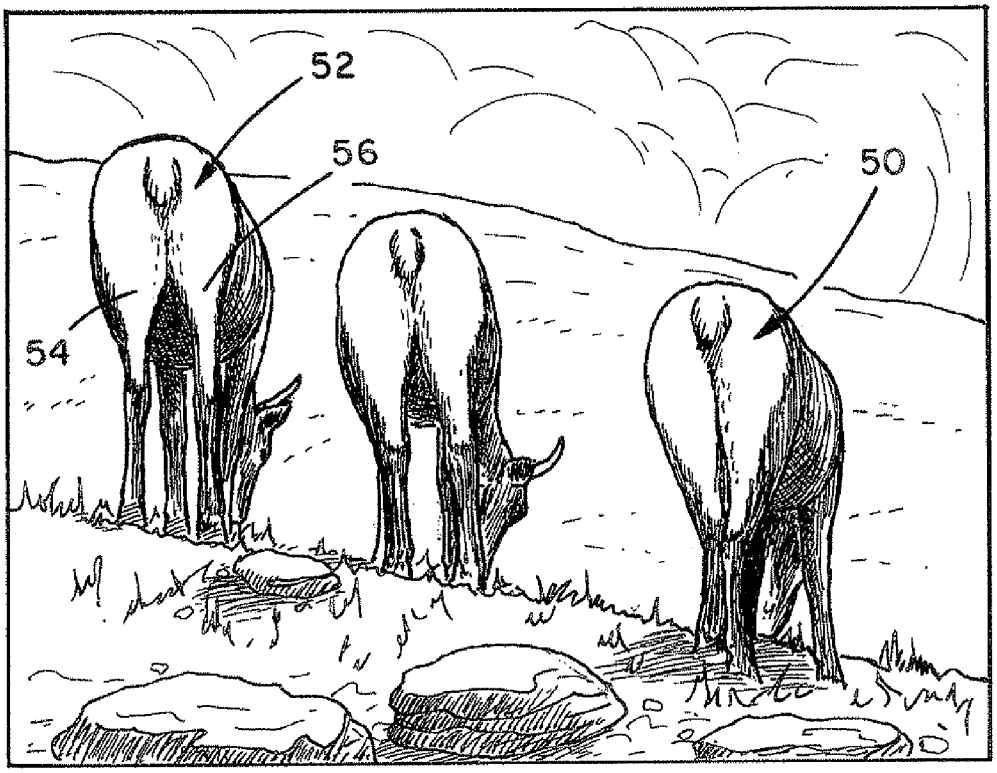
FIG. 3 is rear perspective view of gazing mountain sheep particularly illustrating the rump patches thereof.
Figure 4:
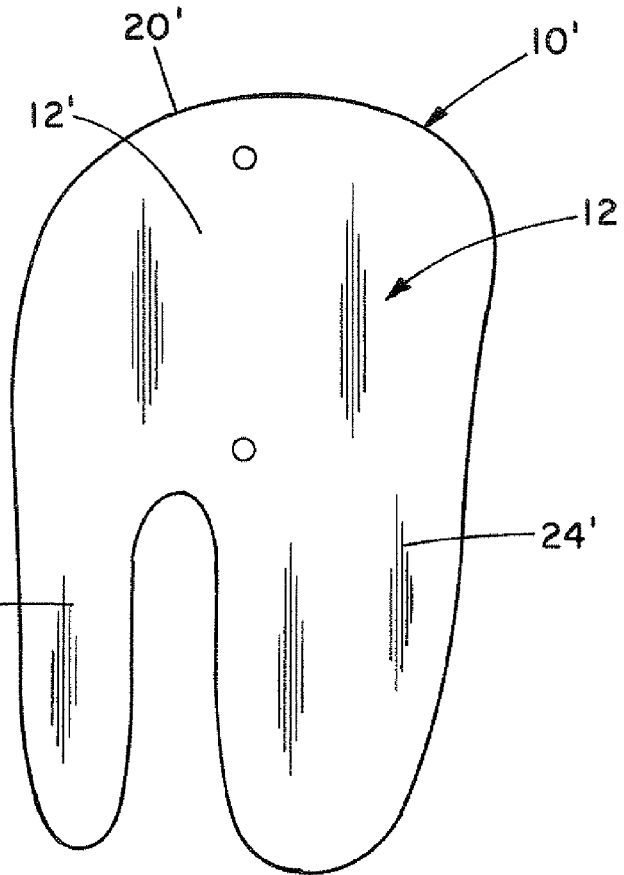
FIG. 4 is a front perspective view of another embodiment of a lure device constructed in accordance with the present invention and particularly useful relative to attracting mountain sheep.

Referring now to FIGS. 3-4, mountain sheep 50 are illustrated. The rump patch 52 of the mountain sheep 50 is different in size and proportional shape from the rump patch 38 of the elk 37 of the prior embodiment. Mountain sheep have shorter torso and legs as compared to elk, so their fractal dimension is different. In this instance, the rump patch 52 includes two elongated portions 54, 56 that extend substantially equal lengths along the entirety of both leg flanks of the mountain sheep 50. However, as the mountain sheep 50 walks, the elongated portions 54, 56 visually change in width dimension, with one always being visibly wider than the other. As a consequence of these natural differentiations in mountain sheep, the device 10', while similar to the device 10 of FIG. 1, is shaped differently in that the object shape is wider to conform to the animal's more "squatty" fractal dimension.

The device 10' is preferably in the form of a flat plate 12 having a pair of opposed outer surfaces or faces 14, 16 as in the prior embodiment. The plate 12 preferably includes an upper lobe portion 18' having a rounded upper edge 20', and a pair of downwardly depending, spaced apart lobe elements 22', 24'. In this preferred form, the first lobe element 22' is elongated and narrow in shape, while the second lobe element 24' is the same length as the first lobe element 22' but is wider throughout its entire length. Thus, wobbling or oscillation of the plate 12 will simulate movement similar to viewing the movement of the rump patch 52 as a mountain sheep 50 is walking.

As described above, most existing lures for animals, including vertebrates, birds and fish, are designed in an attempt to duplicate the animal by simulating size, shape and coloration as perceived by humans. The present invention, however, is based on recognizing the manner in which animals themselves perceive their own shape. This results from an animal's innate judgment of what it sees as similarity without the unnatural human geometric extrapolations based on Euclidean geometry, i.e. lines, circles, squares and the like. It is how animals unconsciously recognize others of their own species and differentiate other animal species. Studies have shown that animals also use fractal dimensions of movement elements. The shape outline is based the average fractal geometric dimension of on an animal species' outline as calculated from multiple lateral views of subject animals. The natural fractal dimension creates a subconscious cognitive response of species relationship, tranquility, and curiosity which is analogous to subliminal responses in humans.

The shape of the device of the present invention is made even more attractive in a sexual context. The preferred shape imitates an animal's rear hind quarter shape and/or color patch outline within the species-specific fractal geometry dimension. The hind view outline is the most often observed shape viewed by herding animals. In this present invention, the stylized shape is derived from both the animal's overall torso fractal dimension and its hind patch outline.

Figure 5:
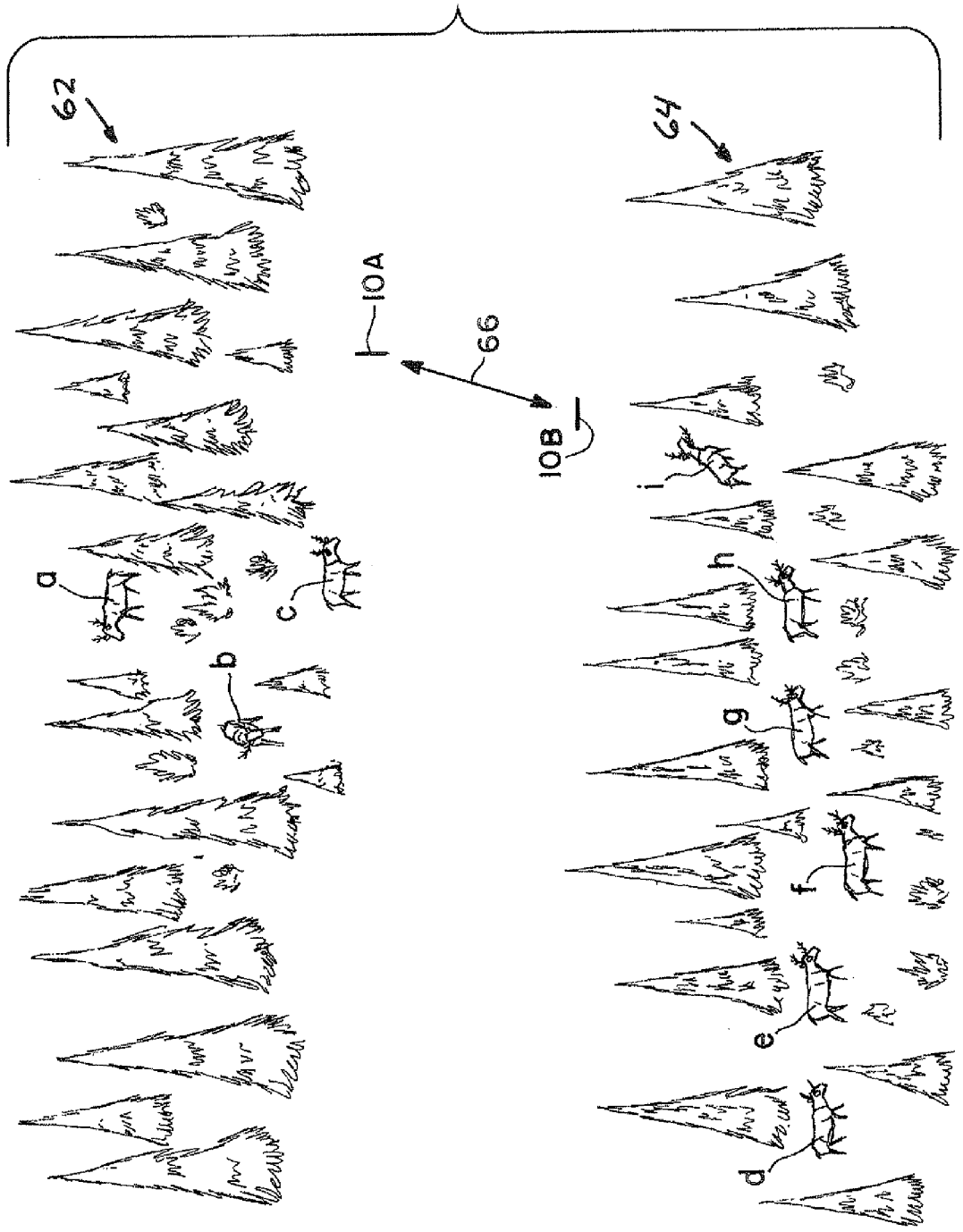
FIG. 5 is a schematic illustrating deployment of lure devices constructed in accordance with the present invention and illustrating one embodiment of the system of the present invention designed for attracting and luring big game animals to come and linger at the edge of a forest and eventually approach the lure devices.

Referring now to FIG. 5, a system utilizing the device of the present invention is illustrated for luring ungulates into an open field, although the same system can be used for other species of animals. In this system, at least one pair of devices 10A and 10B, and possibly multiples thereof, are preferably positioned in the middle of an open field 60. The illustrated field 60 is surrounded by a first section of forest 62 and a second section of forest 64. The devices 10A and 10B are spaced apart from each other a distance 66 with their faces being aligned at substantially 90° relative to each other. In this manner, animals coming from different directions can observe either of the devices 10A or 10B. Since the decoy system illustrated in FIG. 5 is primarily a lure system for game hunting, it successfully entices large game animals to emerge from the forest sections 62, 64 later in the morning and earlier in the evening due to the device coloration and fractal dimensions. For example, elk in the forest section 62 will go to the edge of the trees, study the lure and then go to the lure as illustrated by elk positions a-c. Alternatively, elk in the forest section 64 will walk along the edge of the tree line and then begin to approach the lures as illustrated by elk positions d-i.

Field tests have indicated that the decoy device of the present invention can also attract animals during daylight hours particularly if there are no disturbances. Most ungulates, such as deer, elk, antelope and the like, travel along and within the tree line adjacent the field 60 during twilight and daylight hours. The lure of the invention causes them to pause, observe the lure, and eventually move toward the lure. This provides hunters with a longer time period to discern the animal. This longer period of animal movement extends what is known as the "golden hours of hunting", that is the half hour after sunrise and the final half hour of daylight at the end of the day. The device of the invention is designed to attract animals within shooting distance, or out of the forest to the actual position of the lure. The highly retroreflective material described herein for the passive lure device is effective for long distances from 300-1000 yards, while the fractal dimensional attraction becomes effective at about 300 yd. depending on light and weather conditions.

Figure 7:
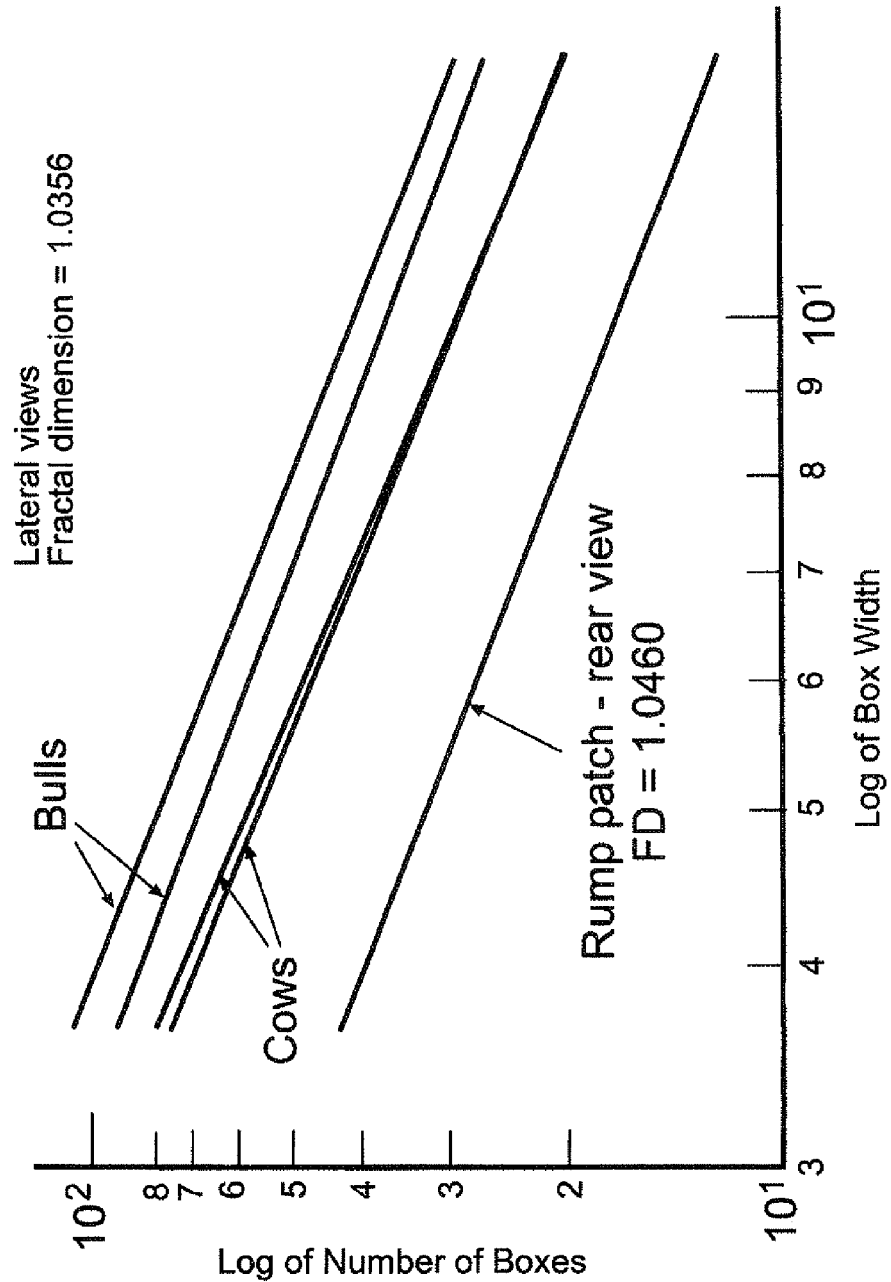
FIG. 7 is a simplified graphical representation illustrating derivation fractal dimention of elk torso profiles and rump as calculated by the Mendlebrot "box method"

As indicated above, the shape of the device 10 is calculated using fractal geometry techniques unique to each animal or bird species. In addition, a sexually evocative shape is stylized for the device 10 from the animal's fractal geometric dimensions combined with their species rear shape and color pattern. To accomplish this, the fractal dimension of a particular species' geometry is calculated. The dimension may be the animal outline, the fur roughness and/or color spectrum, or an animal's ambulatory movement. For the particular lure device 10 for elk, the box geometry method, known to the art, was utilized to derive the fractal dimension by overlaying the side and hindquarter shape for the profile of the animal body. Reference should be made to FIG. 7. The average fractal dimension (Df) for cow and bull elk is 1.0356. The rump patch fractal dimension (Df) varies because of the difficulty of inner leg patch obscurity.

Normal game lures seek to imitate the total animal. In fact, they attempt to duplicate all of the animal's characteristics such as shape, color, shading, pose, odor and size. The objective of these devices is to reproduce an imitation animal which may attract a real animal. As discussed above, this approach is not entirely effective. The present invention utilizes the fractal dimension of the animal along with other features and a results in an object which "just seems right" to the wild animal. The fractal object is non-scalar, so it maintains its attractiveness at various distances. The result is that the fractal imitation looks right to the animal, but the animal is confused about the object. This causes the animal to stop, scrutinize, scan, partially approach to see if and how the object moves, and eventually go to the object. Refer to FIG. 5 above. Field trial tests have shown that sometimes there may be several halts in the animal's approach to the lure. Some elk have even progressed to physical contact with the lure.

Depending on the species of the animal, the fractal dimension of either an animal's profile or the animal's lateral and distal views can be used. The chosen direction is based on an animal's communal habits. The rear view as shown in FIG. 1 is preferable for the elk lure shape for several reasons. The calculated fractal geometric view of an animal may be from any direction. However, it is important to anticipate what the species considers normal and important, and not what is appealing to a human hunter. In the instance of elk, or for that matter any other herding ungulate, the posterior view is selected for detailed fractal profiling. Elk largely graze on grass during dawn, dusk and nighttime conditions. There is usually a lead cow at the head of the herd, and the other animals follow. The dominant herd bull generally follows the herd, and in this position he can observe cows wandering away or other bull's trying to steal cows. It is the light colored rump patch which herd animals subconsciously monitor in dim light. Thus, the dominant profile as observed by each elk is the rear rump patch of other elk. The rear view is also sexually attractive to bull elk. Finally, the rear view is less confrontational and represents an impression of submissiveness and peacefulness, while frontal views are antagonistic and alarming. Thus, a decoy device 10, as illustrated in FIGS. 1 and 8, should mimic the rear view versus the more antagonistic frontal view in order to attract elk.

Figure 6:
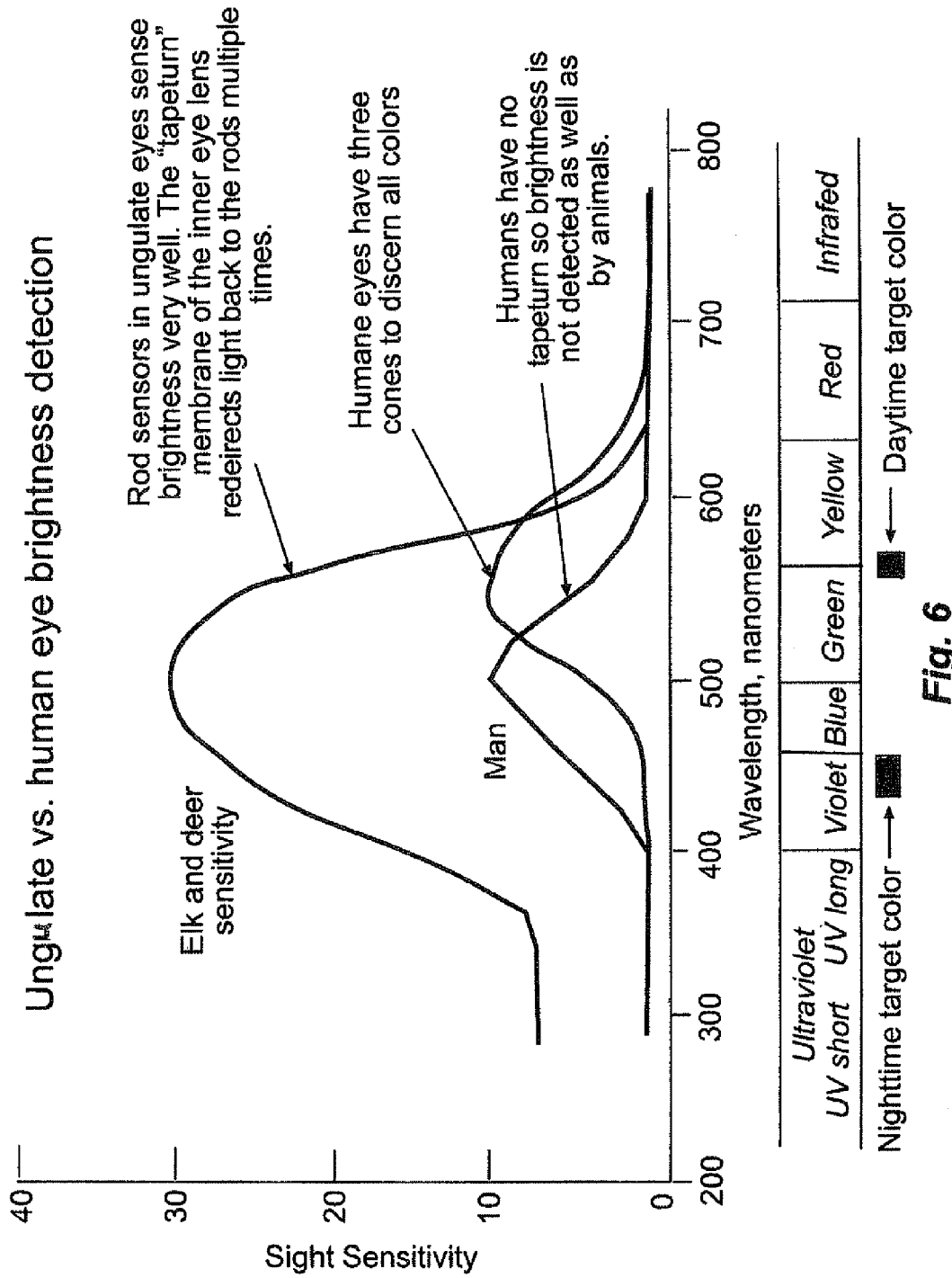
FIG. 6 is a graphical representation comparing brightness sensitivity of humans and ungulates and the brightness perception by ungulates' rods and inner eye tapetum reflective membranes.

As was also pointed out above, existing lures or decoys attempt to attract animals by duplicating the animal's color or the color of an animal's prey. The present invention is distinctly different because it uses color spectrum ranges perceived by the animals, not necessarily by humans. Referring now to FIGS. 1, 6 and 6A, the intensity of the color on the surfaces of the faces 14, 16 creates a color over-saturation or "color overload", which highly excites an animal. Referring to elk sight and as discussed to some extent previously, rod receptors in elk eyes along with the inner eye tapetum reflective membrane receive 90% of its sight as light brightness. This enables elk to see quite well during the low light conditions such as night, dawn, dusk and stormy weather. Eye cones record color as mentioned above, but only 10% of elk vision uses cones. Moreover, elk are relatively color blind and their eyes lack cones capable of seeing color except over two light wavelength spectra, that is ultraviolet peaking at 455 nm and yellow-green peaking at 537 nm. Ultraviolet recognition permits elk nighttime vision and navigation, while yellow-green is the recognizable color needed for daylight foraging. Thus, a highly reflective, fluorescent lure spectrally responsive to light of medium to long wavelengths (475-600 nanometers) is visible by elk under morning twilight and dusk-to-dark conditions. The color spectrum 420 to 480 nanometers would be used for nighttime lures.

The device 10 of the present invention incorporates this spectral response. It preferably utilizes a yellow-green color for daylight periods at an intensity which is not natural in the environment. This creates significant animal curiosity and induces animals to investigate the lure during early dawn, daytime and dusk, thereby extending the hunting time of each day. Passive ultraviolet light reflecting or active (as discussed below) ultraviolet emitting light sources are also visible to ungulates at night when they may be used for population counting and the like, since hunting is not permitted at night. However, even nighttime animal investigations can help hunters under snow conditions in that elk tracks left in the snow by these animals during the night often are used at twilight and daylight hours by other game animals which follow the created trails to the lures. Hunters may also use the tracks to locate game during the daylight hours.

To enhance the yellow-green color intensity, the passive device of the present invention utilizes a highly reflective and in particular retroreflective material with microprisms. In a retroreflective material, most of the light is reflected backward. This material gathers light and reflects that light over a narrow angle. Slow oscillating, rotational movement of the lure as described above creates a pulsating or searchlight-like effect. This characteristic of the invention allows animals to observe it from a distance as a bright light, even under low light conditions including star and moon light. At closer distances, the oscillation or rotation of the lure causes the color to change gently and slightly between different hues of green to yellow, the daylight spectra colors which ungulate eye cones are able to recognize. This material for the passive device 10 has both the retroreflective characteristics and elk excitation color necessary for an effective lure. One example of a material which is ideal and readily available, although the invention is not so limited, is an existing material manufactured by 3M as Diamond Grade Fluorescent Yellow-Green, typically used to warn motorists of school zones.

As discussed above, numerous prior art luring devices incorporate movement particularly of flag tails in attempt to attract animal curiosity. However, field observations during development of the present invention indicate that elk become extremely anxious and eventually panic from rapidly moving or swaying objects. It has been determined that any movement must be slightly rotational since vertical movements are not common in nature. Pendulum-like movements have been observed to be particularly repelling to elk even though the moving objects may be small as compared to the size of the animal. Again, such movements are not common in nature. Subtle wavy movement like a ribbon with both ends fixed may evoke temporary curiosity but eventually spooks the animal.

An animal lure must imitate the natural pulse of the hunting hours, and this is accomplished by the device of the present invention The rapidity and frequency of lure movement is critical. Fast movement, or sporadic-intermittent movement is not tolerated by elk. Infrequent, slow lateral movement seems to perk interest. Field research relating to the present invention has indicated that a slow rotational or oscillatory movement as incorporated in the present invention is the least frightening as well as the most intriguing to big game animals. Slow, intermittent movements occur during the dawn and dusk periods. The attractor device must mimic the slow pace of natural conditions occurring during morning and dusk. The diurnal period of time during which animal movement occurs seems to correlate with the other natural phenomenon occurring at that time, which are also of a calm slow nature. Big game animals are grazing, cautiously assessing potential dangers of their leaving cover and looking for other animals. During this period of time, breezes are generally slight, and other animals/bird's movement and noises are calm. Animal movement is also leisurely and slow without rapid movements during daylight hours.

Figure 1A:
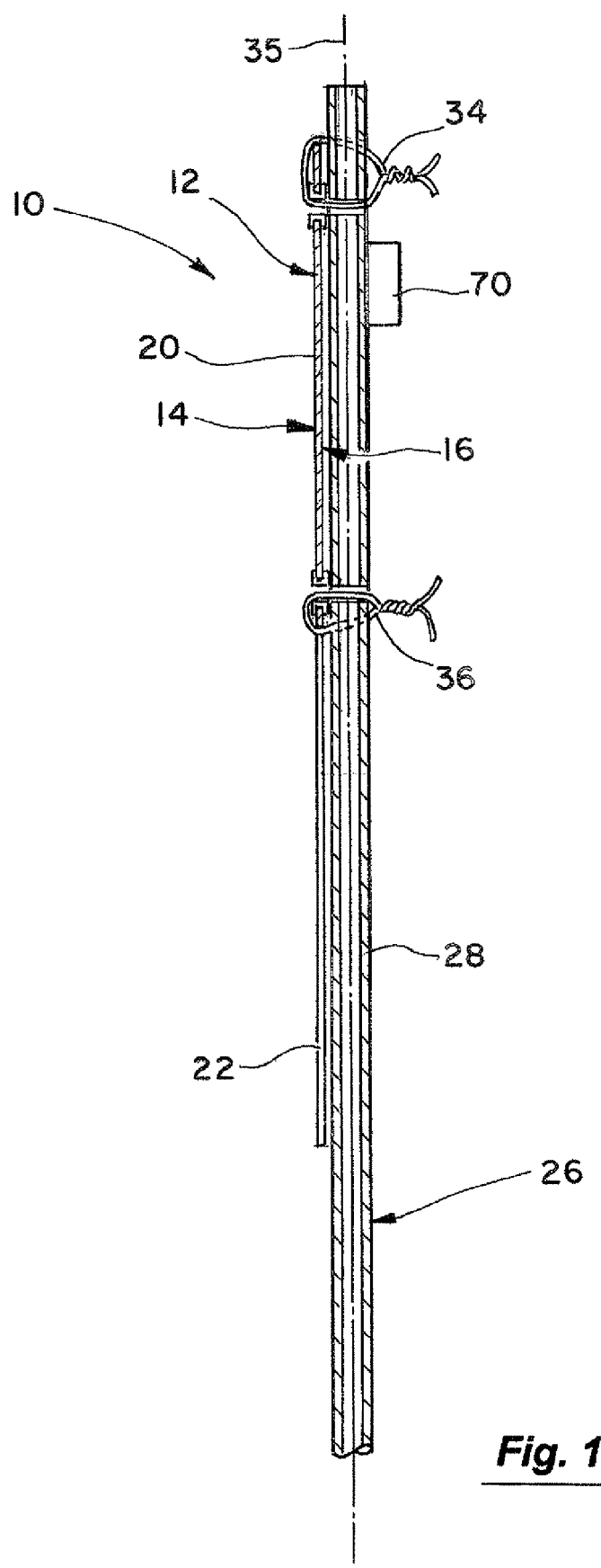
FIG. 1A is a side view of the embodiment illustrated in FIG. 1.

Referring now to FIG. 1A, the present invention may optionally include an auxiliary aromatic scent device 70. In this instance, the scent pack 70 is preferably held in place on the lure device 10 by attaching it to the rod 26. It may also be attached directly to the plate 12 as well. The scent pack 70 may be secured in any desired manner but is preferably secured utilizing a hook and loop attachment material. In preferred form, the scent attractant in the scent pack 70 is a time release material sensitive to heat. As a result, scent is released gradually during the daylight hours in response to the rising sun. Any legal scent attractant may be utilized with the present invention.

The lures 10 and 10' as discussed above are passive in nature in that they utilize opposing surfaces 14, 16 to reflect ambient light. However, the present invention can also be utilized in an active light generating form and arrangement. Referring now to FIG. 8, an active lure device 80 is illustrated. The device 80 is substantially the same in shape and arrangement as the device 10 of FIG. 1. In this particular embodiment, a planar member 82 includes a pair of opposed outer surfaces or faces 84, 86. The planar member 82 is preferably sized and shaped the same as the flat plate 12 of FIG. 1. A mounting mechanism 88 is also provided for securely attaching the device 80 to a ground surface at approximately animal eye level.

In this illustrated embodiment, at least one of the faces 84, and preferably both faces 84, 86, include a plurality of high intensity light generating elements 90 which emit intense and brilliant light in the yellow-green color spectrum as previously described. In this particular embodiment, the light generating elements 90 are preferably a plurality of diodes 92 which are connected to and powered by an energy source 94 attached to the mounting mechanism 88. In preferred form, the energy source 94 is a battery pack. The diodes 92 are preferably attached over the entire surface of the face 84, and preferably both faces 84, 86, so as to continuously generate light in the desired color spectrum and intensity as described above. In this manner, the device 80 does not require ambient light and thus is effective in attracting game animals during dark overcast days and even in the midst of snowstorms. Moreover, the device 80 works very effectively as a nighttime lure.

Another active lure embodiment is illustrated in FIGS. 9-10. In this particular embodiment, a device 80', similar to device 80, includes a planar member 82' having opposed faces 84', 86'. In this particular embodiment, the light generating members 90 are preferably in the form of clear glass or plastic rods 96. The rods 96 penetrate the planar member 82' so as to project outwardly from each of the faces 84', 86'. A plate member 98 is provided and is preferably sized and shaped substantially the same as the planar member or object 82'. The plate member 98 is preferably secured to the planar member 82' at its uppermost portion 100 so as to create a space 102 between the plate member 98 and the planar object 82'. A light source 104 is preferably positioned within the space 102 and is powered by a power source 106 preferably in the form of a battery pack. The light source 104 is designed to emit intense light of the desired color spectrum as previously discussed in detail above. This light is then redirected through the clear rods 96 so as to actively generate light directed outwardly from the face 84'. To enhance the intensity of the light emitted from the face 84', a reflective surface 108 can be provided to reflect any light impinging thereon through the rods 96. In one preferred form, the surface 108 may be silver so as to form a mirrored surface.

FIG. 10 illustrates a modified form of the active lure embodiment 80'. In this particular embodiment, the device 80" includes a planar member 82' having opposed faces 84', 86', similar to the above. In this embodiment, the light generating members 90 are also preferably in the form of clear glass or plastic rods 96 with the rods 96 penetrating the planar member 82' so as to project outwardly from each of the faces 84', 86'. In this embodiment, a plate member 98' having opposing surfaces 110, 112 is preferably secured to the planar member 82' at its uppermost portion 100' so as to create a space 102' between the plate member 98' and the planar object 82'. A plurality of light generating members 90 in the form of glass or plastic rods 96 are also disposed in the plate member 98' so as to project outwardly from the faces 110, 112, similar to the rods 96 projecting from the faces 84', 86'. A light source 114 powered by a battery pack or other known power source 116 is positioned in the space 102'. The light emitted by the source 114 is redirected through the rods 96 disposed in both the planar member 82' and the plate member 98' so as to generate light in opposing directions from the device 80". To further intensify the light generated by the device 80" through the rods 96, the inner faces 86' and 110 may be coated with a reflective substance such as silver. In this manner, the devices 80' and 80" do not require ambient light and thus are effective in attracting game animals during dark overcast days and even in the midst of snowstorms as with the device 80. Moreover, the device 80', 80" also work very effectively as nighttime lures.

As can be seen from the above, the present invention provides an animal lure or decoy device that takes into effect the fact that animals perceive and see other members of their species very differently from how humans see or perceive such animals. As a result, the device of the present invention has a shape that is based on the fractal geometry unique to each animal species. The device of the invention can be both a passive lure having a high retroreflectivity or an active lure generating intense light. Both the passive and active lure embodiments generate a species-specific spectral color which exploits a particular species' partial colorblindness. By doing this, the present invention introduces an unnatural sight into the natural surroundings as perceived by animals so as to maximize an animal's curiosity. The lure the present invention is also designed to provide a sexually evocative shape stylized from the animal's fractal geometric dimensions combined with the species rear shape and color pattern, which evokes curiosity and excitement. Finally, the present invention is designed to provide a shape which moves in a manner that imitates an animal's movement as viewed by other members of that animal species.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

I claim:

1. A lure device for attracting a predetermined species of animal based on fractal geometry and the animal's own color perception, said device comprising:
    a planar object having at least two opposed faces and a shape unique to the fractal dimension of the predetermined animal species the device is designed to attract;
    a light emitting surface disposed on at least one face of said planar object, said surface being covered with light generating elements adapted to emit a light color based on color perception of said specific predetermined species which color wavelength and brilliance is unnatural in normal surroundings relative to said species' own color perception; and
    a mechanism for mounting said object and enabling oscillatory-like movement in said object about an axis thereof.

2. The lure of device as claimed in claim 1, wherein the color of light created by said light emitting surface is based on the wavelength sensitivity of the eye cone receptors of the predetermined animal species.

3. The lure device as claimed in claim 2, wherein the color of light created by said light emitting surface is sufficiently intense to create visual color overload and saturation at the specific wavelength spectrum selected for the predetermined species.

4. The lure device as claimed in claim 1, wherein said fractal dimension is selected based on the profile of said predetermined animal species, which profile is naturally pleasing to the animal and invokes curiosity from that species.

5. The lure device as claimed in claim 1, wherein said predetermined animals are game animals, and wherein said object shape comprises the shape and color pattern of the rear rump patch of said game animal, said movement mechanism being adapted to simulate the changing exposure of colored inner leg flanks of the game animal.

6. The lure device as claimed in claim 5, wherein said device is adapted to attract ungulates, and wherein said object comprises an upper lobe member, a first depending element elongated in shape and substantially uniform in width dimension, and a second depending element wider and shorter in shape relative to said first depending element.

7. The lure device as claimed in claim 1, wherein said light generating elements are passive light reflecting elements.

8. The lure device as claimed in claim 7, wherein said light emitting surface is retroreflective, and said light generating elements comprise optical microprisms for reflecting sunlight impinging thereon.

9. The lure device as claimed in claim 1, wherein said light generating elements are active light generating members.

10. The lure device as claimed in claim 9, wherein said active light generating members comprise a plurality of light emitting diodes.

11. The lure device as claimed in claim 9, wherein said device further comprises a plate member sized and shaped substantially the same as said planar object, said plate member being secured to and spaced apart from said planar object, and a light source disposed in the space between said planar object and said plate member, and wherein said active light generating elements comprise a plurality of clear, light transmitting rods projecting through said planar object into the space between said planar object and said plate member for exposure to the light generated by said light source.

12. The lure device as claimed in claim 11, wherein said plate member further includes a plurality of clear, light transmitting rods projecting through said plate member into the space between said planar object and said plate member for exposure to the light generated by said light source.

13. A decoy device for luring big game animals, said device comprising:
    a planar object having at least two opposed faces and a shape unique to the fractal dimension of the particular predetermined big game animal species the device is designed to attract;
    a highly retroreflective surface disposed on at least one face of said planar object, said surface being covered with optical microprisms and having a species specific color adapted to exploit the color blindness and color perception of the specific predetermined big game species, which color brilliance is unnatural in normal surroundings relative to that species' own color perception; and
    a mounting mechanism for mounting said object at the approximate eye height for the particular predetermined big game animal species the device is designed to attract, said mechanism further adapted to enable oscillatory-like movement of said object about an axis thereof to imitate movement of an animal.

14. The decoy device as claimed in claim 13, wherein the color of said retroreflective surface results from the wavelength spectrum sensitivity of the eye cone receptors of the particular predetermined big game animal species the device is designed to attract, the intensity of said color being sufficient to create visual color overload and saturation at said wavelength spectrum to create animal curiosity.

15. The decoy device as claimed in claim 13, wherein said fractal dimension is selected based on the rear rump patch profile of said predetermined big game species to create a sexual interest view, said mounting and movement mechanism being adapted to simulate the changing exposure of the colored inner leg flanks of the animal to simulate walking movement of the animal.

16. The decoy device as claimed in claim 15, wherein said device is adapted to attract ungulates, and wherein said object comprises an upper lobe member, a first elongated element depending from said upper lobe member, and a second element depending from said upper lobe member and spaced from said first element, said second depending element being wider and shorter in dimension relative to said first depending element.

17. The decoy device as claimed in claim 16, wherein said device mounting mechanism comprises a post member adapted for insertion into the ground surface, a pair of apertures defined in upper and lower portions of said upper lobe member, and attachment members passing through said apertures to secure said object to said post member to enable said object to sway in an oscillatory-like manner in response to air movement.

18. The decoy device as claimed in claim 16, wherein said ungulates comprise elk and deer, and wherein the specific color of said retroreflective surfaces is an intense green-yellow in the spectral wavelength range of approximately 525-600 nanometers during early morning and twilight hours and 420-480 nanometers during nighttime hours to create maximum animal curiosity resulting from low receptivity for natural objects at these color wavelengths by elk and deer.

19. A system for attracting and luring big game animals into open fields for hunting or herd management, said system comprising:
   at least one pair of decoy devices each in the form of a planar object having at least two opposed faces and a shape unique to the natural fractal dimension of the particular big game animal species which said system is designed to attract and lure;
   a mounting mechanism for securing each said decoy device to the ground surface and attaching said planar object thereto to enable oscillatory-like movement thereof about the axis of the mounting mechanism;
   a light emitting surface disposed on at least one face of said planar object, said surface being covered with light generating elements adapted to emit a light color based on a species specific color adapted to exploit the color blindness and color perception of the desired specific big game species for which said system is designed to attract and lure, which color and brilliance is unnatural in normal surroundings relative to that species' own color perception; and
   said pair of decoy devices being mounted to the ground at animal eye level and spaced apart at approximately 90° relative to each other to attract the desired specific big game animals from all directions.

20. The system as claimed in claim 19, wherein said light emitting surface is disposed on both opposed faces of each said decoy device.

21. The system as claimed in claim 19, wherein said system is designed to attract ungulates, wherein the fractal dimension of said object shape is selected based on the animal outline plus the fractally derived rear rump patch profile of ungulates to create a sexual interest view, and wherein the shape of each said planar object is defined by an upper lobe member, a first elongated element depending from said upper lobe member, and a second element depending from said upper lobe member and spaced from said first element, said second element being wider and shorter in dimension relative to said first depending element.

22. The system as claimed in claim 19, wherein each decoy device further includes an auxiliary aromatic scent attractant secured to said mounting mechanism and adapted for heat sensitivity to create time-release thereof in response to the rising sun.

* * * * *